US007232599B2

(12) United States Patent  
Nieto (10) Patent No.: US 7,232,599 B2  
(45) Date of Patent: Jun. 19, 2007

(54) FRIABLE SANDSTONE STRUCTURAL BLOCKS

(76) Inventor: Alberto Nieto, 407 W. University Ave., Suite 504, Champaign, IL (US) 60010

( * ) Notice: Subject to any disclaimer, the term of this patent is extended or adjusted under 35 U.S.C. 154(b) by 220 days.

(21) Appl. No.: 10/771,039

(22) Filed: Feb. 3, 2004

(65) Prior Publication Data

US 2005/0170137 A1   Aug. 4, 2005

(51) Int. Cl.
*B32B 1/00* (2006.01)
(52) U.S. Cl. .......................................... 428/76; 428/68
(58) Field of Classification Search .................. 428/68, 428/76
See application file for complete search history.

(56) References Cited

U.S. PATENT DOCUMENTS

| 4,338,353 A * | 7/1982 | Melchior ..................... 427/496 |
| 2001/0002412 A1* | 5/2001 | Kolarik ....................... 523/210 |

OTHER PUBLICATIONS

Quotation from the publication "The Temple of Dendur" (1978).*
The Metroplitan Museum of Art Bulletin, New Series, vol. 36, No. 1, The Temple of Dendur. 1978, pp. 1 and 23.*

* cited by examiner

*Primary Examiner*—Alexander S. Thomas
(74) *Attorney, Agent, or Firm*—Cardinal Law Group (57) ABSTRACT

The structural block made from friable sandstone of the present invention includes a friable sandstone block quarried from a friable sandstone deposit in which the friable sandstone has an inherent structure providing strength, and cement disposed within the inherent structure to lock the inherent structure in place. In another embodiment, a confining jacket can be disposed about a friable sandstone block to lock the inherent structure in place. If desired, the cement or confining jacket can include a coloring agent such as a dye or pigment for aesthetic effect. The method for making structural block from friable sandstone of the present invention comprises determining whether the friable sandstone is quarriable, treating the friable sandstone in place if the friable sandstone is not quarriable, quarrying the friable sandstone into friable sandstone blocks, and finishing the friable sandstone blocks into structural blocks.

31 Claims, 8 Drawing Sheets

FRIABLE SANDSTONE STRUCTURAL BLOCKS

TECHNICAL FIELD

The technical field of this disclosure is building materials, particularly, structural blocks made from friable sandstone.

BACKGROUND OF THE INVENTION

Presently, civil engineering depends on concrete, masonry stones such as limestone, or naturally cemented sandstones for structural support of small, medium, and large civil engineering construction projects. Yet, in certain locations, such materials are either unavailable or cannot be produced at a reasonable cost. Raw materials, energy, or fuel may not be available in the locale. In addition, natural materials and concrete may not be the best materials for thermal insulation, long-term mechanical stability, and long-term chemical stability. Natural materials can also be difficult to quarry and finish because the same hardness that makes them durable also makes them difficult to work. Natural materials also limit color choice.

A substantial percentage of the sandstone deposits available throughout the world are friable sandstone, which has been considered too fragile to use in construction. The structures of friable sandstone deposits are weak and the friable sandstone can disaggregate during quarrying, handling, or finishing, so that the sandstone becomes sand. This occurs in spite of the fact that the friable sandstone deposits themselves have an inherent structure that makes them a strong structural material.

One example of deposits of friable sandstones that exist throughout the world is quartz arenites. These friable sandstones are typically composed of un-cemented or very poorly cemented sand-sized (2 mm to 0.06 mm) quartz grains with ages ranging from several hundreds of millions of years (Precambrian, Cambrian and Ordovician geological periods), several millions of years (upper Tertiary geological period), or even younger. Quartz arenites are common in the geological record and make up about one-third of all sandstones. One example of an old quartz arenite deposit is the St. Peter Sandstone, an Ordovician period quartz arenite widely distributed throughout the central United States. An example of a relatively young quartz arenite deposit is the Iquitos formation, and equivalent formations, widely distributed in the Amazon basin of South America (Peru, Colombia, Brazil, Ecuador, etc.). These young quartz arenites are essentially cohesionless and are referred to herein as aged sands.

Quartz arenites are sedimentary rocks made up of 90 to 95% sand-sized quartz grains (crystalline silica). They are often very friable, that is, they can be easily disaggregated into the sand-grain components and turn into loose sand with relatively little effort, such as finger pressure or very gentle taps with a hammer. This characteristic is useful for quarrying sand, but a problem for quarrying building materials. The St. Peter Sandstone in north central Illinois is quarried by blasting large faces, which turns the sandstone into loose sand. The sands are then handled as slurries and sorted according to grain size. Demand for friable quartz arenites comes mostly from their use as sand for the glass, petroleum, and sandblasting industries.

Use of friable quartz arenites as sand fails to take advantage of the in situ strength of the material. As the quartz sand grains are deposited during sandstone formation, the overburden pressure is concentrated at the very small areas of contact between individual sand grains as very high normal stresses. In a process called pressure solution, matter from solid silica sand grains dissolves in areas of high normal stress concentration and is moved along the contact boundaries into open pore spaces by diffusion. The dissolved silica either migrates to locations where it precipitates or precipitates on the free grain surfaces near the sites of dissolution, coating the sand grains with quartz overgrowths.

The net result of dissolution is an increase in size of contact areas between the sand grains. The shear resistance of sands (resistance to deformation by externally applied loads) is largely controlled by frictional resistance, and frictional resistance is controlled by the area of contact between the surfaces. Therefore, the sand deposits become stronger with time, although at a slowly decreasing rate.

Other factors besides dissolution that may increase the strength of sand deposits with time are cementation and compaction (reduction of pore space). The combined result of all these three processes over time is called diagenesis, which implies the transformation of sediment (sand) into sedimentary rock (sandstone). In quartz arenites, the largest contribution to their strength comes from pressure solution, and cementation is relatively minimal.

Although friable sandstones have great strength while the constitutive grains remain in their original configuration, the grain structure is easily disturbed and disaggregates readily into sand with relatively little effort U.S. Pat. No. 4,072,019 to L. L. Pearson treats friable St. Peter Sandstone soil in place to prevent the need to shore up excavations and tunnels, but does not suggest use of the stabilized sandstone as structural units in construction.

It would be desirable to have structural blocks made from friable sandstone that would overcome the above disadvantages.

SUMMARY OF THE INVENTION

One aspect of the present invention provides structural blocks made from friable sandstone.

Another aspect of the invention provides structural blocks that are readily quarried and finished.

Another aspect of the invention provides structural blocks having superior thermal insulation characteristics.

Another aspect of the invention provides structural blocks of superior long-term mechanical and chemical stability.

Another aspect of the invention provides structural blocks requiring less energy to produce.

Another aspect of the invention provides structural blocks of various colors.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DESCRIPTION OF THE PRESENTLY PREFERRED EMBODIMENTS

The structural block made from friable sandstone of the present invention comprises a friable sandstone block quarried from a friable sandstone deposit in which the friable sandstone has an inherent structure providing strength, and cement disposed within the inherent structure to lock the inherent structure in place. In another embodiment, a confining jacket can be disposed about a friable sandstone block to lock the inherent structure in place. A protective layer on the outside of the structural block can be used to protect the block from abrasion or chemical attack, if desired. The cement or confining jacket can include a coloring agent such as a dye or pigment for aesthetic effect. The method for making structural block from friable sandstone of the present invention comprises determining whether the friable sandstone is quarriable, treating the friable sandstone in place if the friable sandstone is not quarriable, quarrying the friable sandstone into friable sandstone blocks, and finishing the friable sandstone blocks into structural blocks.

Friable sandstones as used in the present invention are defined as those sandstones generally considered too fragile for structural applications because they disaggregate when disturbed, changing from sandstone to sand. Friable sandstones have a unique inherent structure, which is the intimate grain contact developed by pressure solution over tens of thousands to several hundreds of millions of years. The grains are locked, providing much greater strength that simple sand with an equivalent relative density. Once the grains are moved, the inherent structure is destroyed and it is impossible to reconstruct the assemblage to obtain the same strength. Quarriable friable sandstones are sufficiently stable that they can be quarried and handled without disaggregating prior to treatment. Unquarriable friable sandstones are so fragile that they must be treated prior to removal from the quarry because they disaggregate when handled.

Friable sandstones are found in the United States and throughout the world. One example of friable sandstones is the quartz arenites, which are common in the geological record and make up about one-third of all sandstones. Quartz arenites are composed of 90–95 percent quartz grains. Quartz arenites deposits include the St. Peter Sandstone of the Upper Mississippi Valley, and other sandstone deposits from Idaho, Colorado, California, Michigan, Nevada, Utah, Idaho, Minnesota, Iowa, and Wisconsin. Most of these quartz arenites deposits are Paleozoic, but some are Precambrian. Jurassic quartz arenites deposits include the Navajo sandstone and the Entrada formation in the Colorado Plateau. Most quartz arenites sandstones have single minerals in their grains, are exceedingly pure in quartz, have little matrix, and are therefore are said to be super mature. Mature sediments have evolved from their parent rock by weathering and erosive processes acting over a long time and with great intensity. Thus, they are composed of chemically and mechanically stable quartz grains—the only materials that survived those processes.

Figure 1:
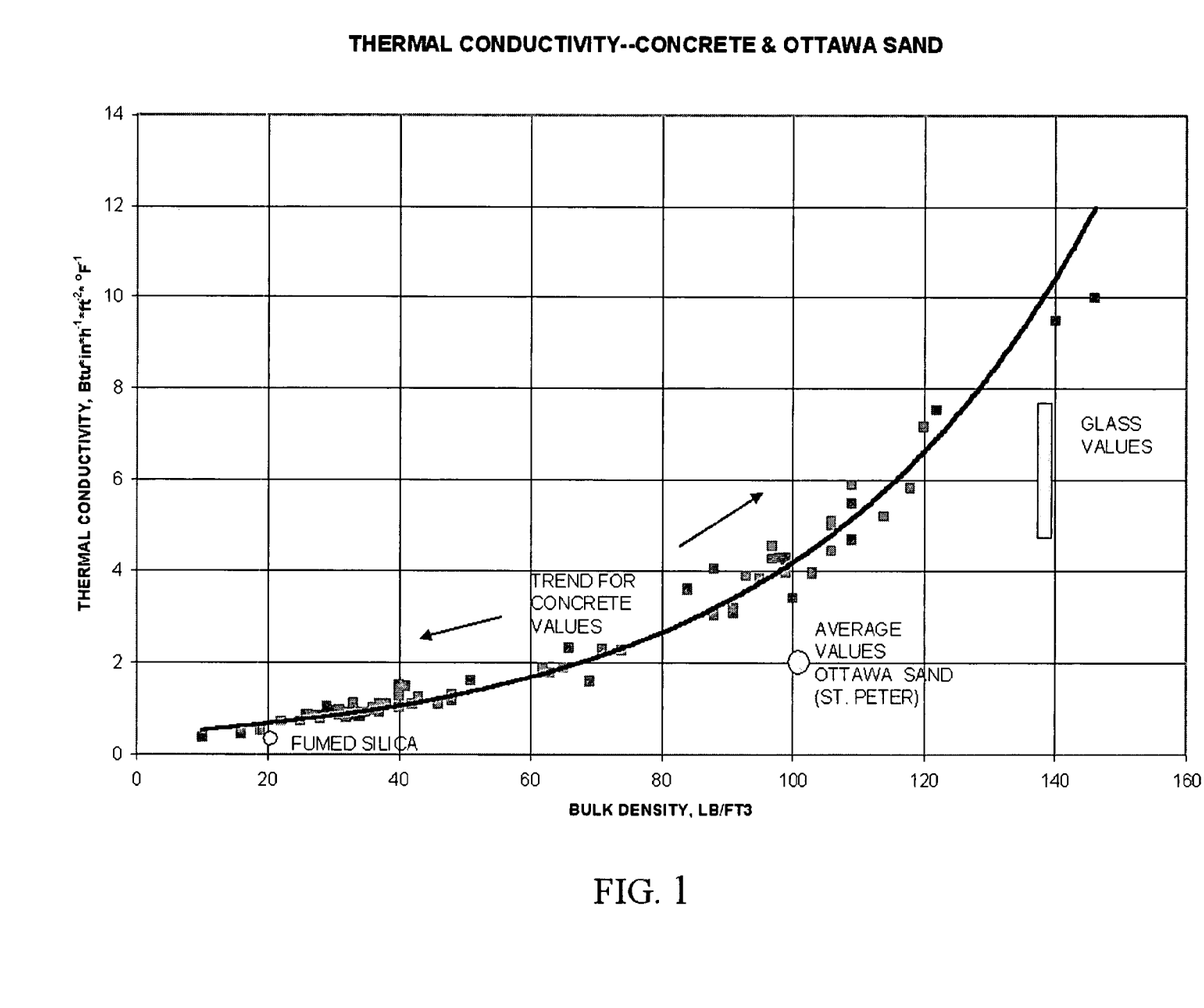
FIG. 1 shows a plot of thermal conductivity versus density for various types of light concrete, Ottawa sand (St. Peter Sandstone), and other types of silica-based materials.

Friable sandstones typically contain air filled pore spaces, which provide better thermal insulation characteristics than other structural materials, such as concrete, limestone, and cemented sandstones in which pores are filled with silica or other cements. FIG. 1 shows a plot of thermal conductivity versus density for various types of light concrete, Ottawa sand (St. Peter Sandstone), and other types of silica-based materials (data: National Institute Of Standards And Technology, U.S. Commerce Department, February 2000; http://srdata.nist.gov/insulation). For comparable bulk densities, the thermal conductivity of all silica materials is much lower than thermal conductivities of concrete. The thermal conductivity values for Ottawa sand (St. Peter Sandstone) are less than half those for concrete with the same bulk density.

Figure 2:
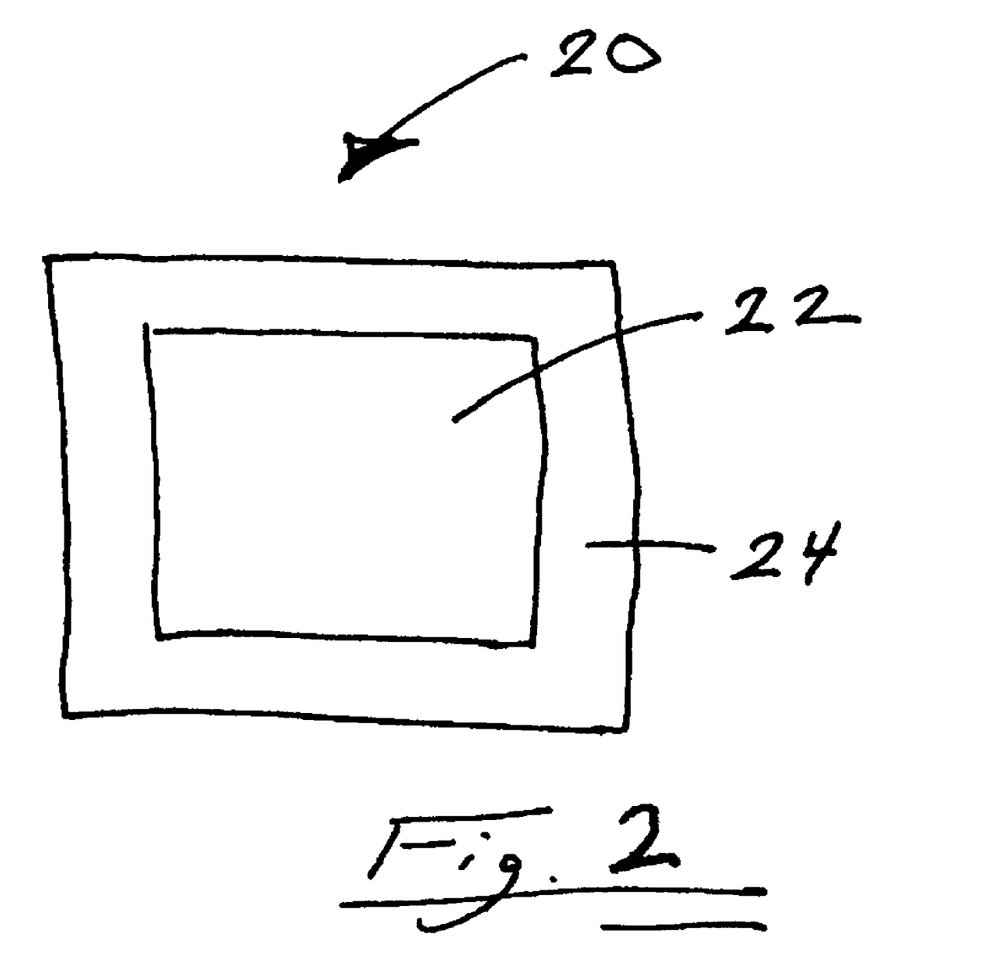
FIG. 2 shows a schematic view of a structural block made from friable sandstone in accordance with the present invention.

FIG. 2 shows a schematic view of a structural block made from friable sandstone in accordance with the present invention. The inherent structure of the friable sandstone grains is locked in position to prevent the sand grains from rotating or becoming separated from the intimate contact developed through pressure solution. Such rotation or separation can occur upon application of a structural load. The inherent structure is locked in position by applying cement or grout to a friable sandstone blocks to form a confining layer or by coating the friable sandstone blocks with a high tensile strength material to form a confining jacket. The cement or grout can be applied to the friable sandstone before or after quarrying, depending on the friable sandstone characteristics and the results desired. In one embodiment, the cement or grout permeates the whole of the structural block to lock the inherent structure of the friable sandstone.

Referring to FIG. 2, structural block 20 comprises a core 22 and a confining layer 24. In one embodiment, the core 22 can be friable sandstone and the confining layer 24 can be friable sandstone treated with a cement or grout. The inherent structure of the friable sandstone can be locked in place in the confining layer 24 by the cement and locked in place in the core 22 by the confining layer 24. The core 22 and the confining layer 24 can be well defined, although those skilled in the art will appreciate that the boundary between the two can be gradual and not distinct. The size of the core 22 can be very small or the core 22 missing altogether, so that the whole structural block 20 comprises the confining layer 24 of treated friable sandstone.

The cement used to form the confining layer 24 can be cement with low enough viscosity to penetrate the relatively permeable friable sandstone, such as sodium silicate or micro-fine Portland cement. The strength of the structural block comes from maintaining the original structure of the friable sandstone with the cement, rather than through the strength of the cement itself. The cement or grout can be applied to the exterior of friable sandstone block by injection during quarrying, spraying, or dipping.

In another embodiment, the cement or grout can be applied to the surface of the friable sandstone deposit and allowed to percolate to a desired depth. Only enough cement or grout is applied to allow the friable sandstone deposit to hold together so that it can be quarried into friable sandstone blocks, and not so much as to saturate all the pore space in the friable sandstone. The quarried friable sandstone blocks can be treated with cement or grout again or finished into structural blocks as desired. Cementing the friable sandstone without saturating all the pore space can be useful if low bulk densities structural blocks are desired. Cementing the friable sandstone without saturating all the pore space also allows flexibility for later, multi-stage treatment. For example, cement including a different color or cement with different properties can be used on an individual quarried friable sandstone block, rather than treating all the friable sandstone blocks in a slab the same.

The structural block 20 can be kept a natural color, which is typically an aesthetically pleasing white or light-tan color, or a full range of colors can be obtained by adding coloring agents, such as dyes or pigments, to the cement or grout. Typically, no additional protective coating is required to protect the structural block 20 from chemical attack because the friable sandstone is made of extremely stable quartz grains, although a protective coating can be used to prevent abrasion, or chemical attack, if desired. A confining jacket of high tensile strength material can also be applied to the outside of the confining layer 24 for protection or additional strength.

In another embodiment, the core 22 can be friable sandstone as quarried and the confining layer 24 can be a thin confining jacket made of a high tensile strength material, such as epoxy, one-component or two-component polyurethane, cyanoacrylate, fiber-reinforced cement, polysiloxane resin, combinations thereof, or similar high tensile strength material. The confining layer 24 can also be created by fusing powdered silica disposed on the faces of the structural block. The inherent structure of the friable sandstone in the core 22 can be locked in place by the confining layer 24. The confining layer 24 can between about 1 mm thick to about 5 mm thick, with a typical thickness of about 2 mm. The high tensile strength material can be applied by spraying, brushing, painting, or dipping. The high tensile strength material can also be applied in a multi-step process, such as by applying a coating of pure sodium silicate grout (silica/soda ratio: 3.3 by weight) and then applying another coating of a strong acid, which sets the grout to a high strength.

The structural block 20 can be kept a natural color, which is typically an aesthetically pleasing white or light-tan color, by application of a clear high tensile strength material, or a full range of colors can be obtained by adding a coloring agent such as a dye or pigment to the high tensile strength material. The confining layer 24 can be used to protect the structural block 20 from abrasion or chemical attack, or an additional protective coating can be applied.

Experimental results have shown that the present invention produces structural blocks with compressive strength comparable to standard concrete, i.e., between 3,000 to 4,000 psi for St. Peter Sandstone and cement. Other materials can give higher or lower values depending on the age of the material and the type of cement. Even the youngest, weakest treated materials, e.g., material from the Iquitos formation, can yield values of compressive strength of several hundred psi, well above the requirements for one- and two-story buildings. The increase in strength is most dramatic for younger friable sandstones. Providing the friable St. Peter Sandstone with a confining jacket approximately doubles the compressive strength over that of friable sandstone as quarried, while treating the friable sandstone with cement approximately triples the compressive strength.

In testing, specimens of St. Peter Sandstone were obtained from a quarry near La Salle, Ill., and prepared as 2 inch by 4-inch cylinders. The compressive strength of specimens of St. Peter Sandstone as quarried ranged between 408 psi and 1806 psi with an average strength of 1300 psi. Six specimens were coated with high tensile strength film jackets: three with epoxy and three with cyanoacrylate. After curing seven days, the compressive strengths of the specimens coated with high tensile strength film were between 2065 and 3023 psi with an average of 2514 psi. Twelve specimens were treated with sodium silicate cement comprising by volume 1.9 parts water, 1 part sodium silicate, and 0.1 part hardener or gelling agent. The specimens were slowly dipped in the cement to prevent air entrapment, then left in the cement bath for half an hour or until the cement gelled, which was formulated to be about 45 minutes. After curing twelve days, the compressive strengths of the specimens treated with cement were between 2550 and 5016 psi with an average of 3566 psi. Other testing indicates that there are no large compressive strength increase occurs in the specimens between 7 and 12 days of curing, so the difference in strength between the jacketed specimens and the cemented specimens is due to the method by which the inherent structure was preserved.

Another test was performed to demonstrate that the strength of the cement-treated specimens comes primarily from the inherent structure of the friable sandstone as quarried, and not from the cement. Samples of St. Peter Sandstone were disaggregated, then highly compacted to form cylinders similar in size to those used above. Six specimens were treated with sodium silicate cement comprising by volume 1.9 parts water, 1 part sodium silicate, and 0.1 part hardener or gelling agent. The specimens were slowly dipped in the cement to prevent air entrapment, then left in the cement bath for half an hour or until the cement gelled, which was formulated to be about 45 minutes. After curing twelve days, the compressive strengths of the disaggregated specimens treated with cement were between 189 and 401 psi with an average of 301 psi. Because this is only about one tenth of the compressive strength of the cement-treated quarried stone, the strength of the cement-treated specimens comes primarily from preservation of the inherent structure of the friable sandstone as quarried.

The method of fabricating structural blocks made from friable sandstone depends on the characteristics of the friable sandstone. As a natural material, the structure of friable sandstone in different deposits and within a deposit varies from very fragile to somewhat stable. For fabricating structural blocks, the friable sandstones can be divided into quarriable and unquarriable. The quarriable friable sandstones are sufficiently stable that they can be quarried and handled without disaggregating prior to treatment. One example of marginally quarriable friable sandstone is the St. Peter formation in the central United States. One example of unquarriable friable sandstone is the Iquitos formation in Peru. The unquarriable friable sandstones are so fragile that they must be treated prior to removal from the quarry because they disaggregate when handled. The fragility of the unquarriable friable sandstone leads them to be known as aged sands.

Figure 3:
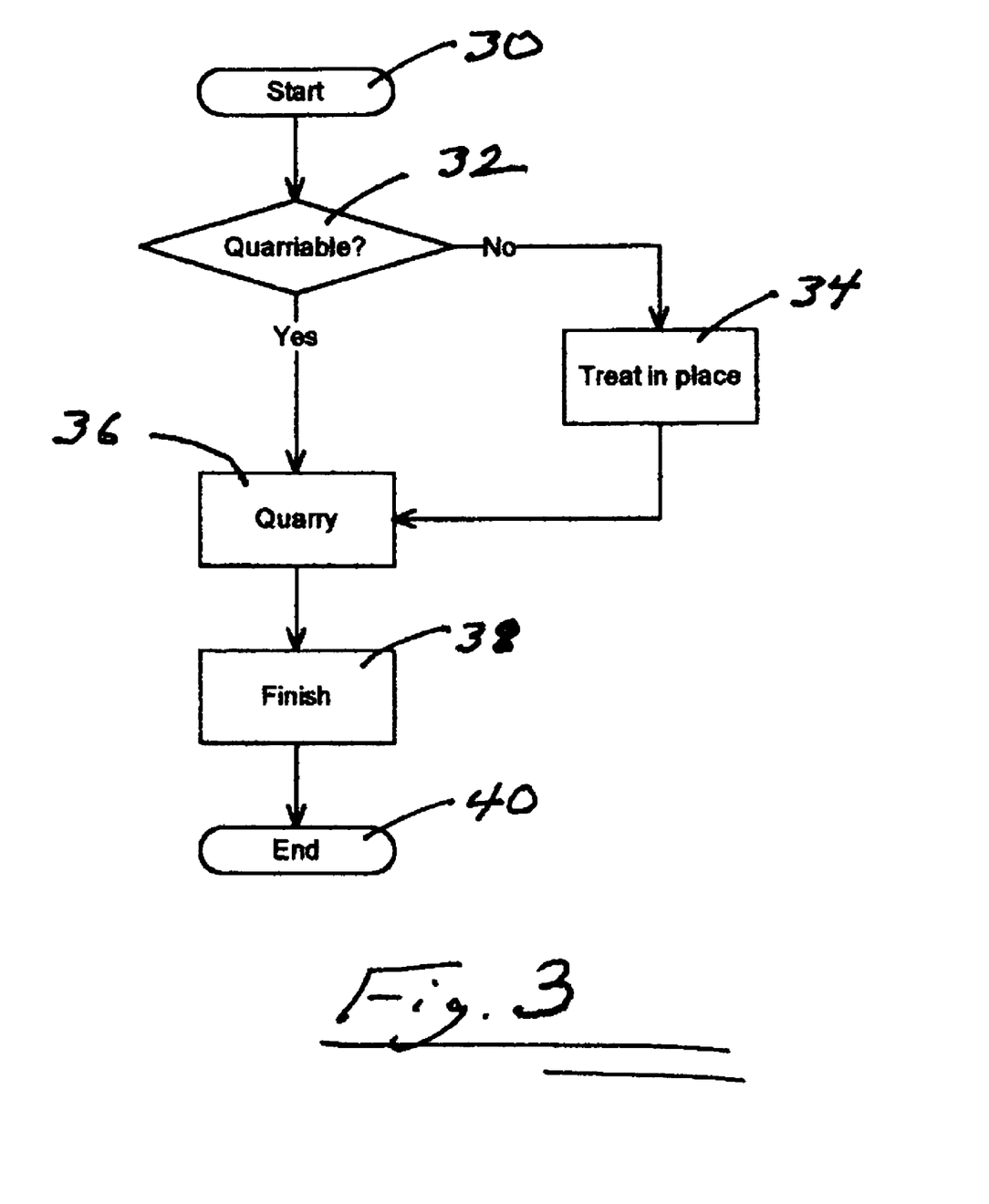
FIG. 3 shows a flow chart for a method of making a structural block from friable sandstone according to the present invention.

FIG. 3 shows a flow chart for a method of making a structural block from friable sandstone according to the present invention. The fabrication starts 30 and a determination is made as to whether the friable sandstone deposit is quarriable or unquarriable 32. The determination can be based on field or laboratory tests of the friable sandstone characteristics. If the friable sandstone deposit is unquarriable, the friable sandstone can be treated in place 34 with cement or grout to lock in the inherent structure. If the friable sandstone deposit is quarriable, the friable sandstone can withstand handling and be quarried without treatment in place. The friable sandstone can be quarried 36 into rough friable sandstone blocks and finished 38 into structural blocks. The quarrying and finishing can take advantage of the friability of the friable sandstone by dislodging the sand grains, rather than grinding them. The finishing can include sizing, face finishing, grout treatment, curing, protective coating application, or confining jacket application, as desired. The structural block is complete and the method ends 40.

Fabricating a structural block from quarriable friable sandstone comprises quarrying a friable sandstone block having inherent structure from a friable sandstone deposit, locking in the inherent structure, and finishing the structural block as desired for the particular application. The inherent structure can be locked in by applying cement or by applying a confining jacket to the friable sandstone block.

The quarrying and working of the friable sandstone blocks can take advantage of the fact that friable sandstone readily disaggregates. The tools used to work the friable sandstone, such as a drill bit, saw (chain saw, wire saw, or blade saw), or abrading tool, can dislodge the grains from their inherent structure rather than engaging the high quartz hardness. As the grains are dislodged, the grains can be evacuated with fast flowing water or air, rather than ground. This avoids engaging the hardness of the quartz grains with the tool. Wet operation has the further advantage of avoiding airborne silica dust. Those skilled in the art will appreciate that many operations are suitable for quarrying the quarriable friable sandstone. For example, drills can be used to provide access for hydraulic splitters, which fracture the structural blocks from the sandstone deposit. Quarrying and working can be performed before treating or before the cement cures while the sand grains of the inherent structure can be easily dislodged.

The friable sandstone blocks can be quarried in the final size, or can be quarried in a large block, then split or cut to a smaller final size. Typical useful sizes can be in the range of 4 in.×6 in.×8 in. to 4 ft.×4 ft.×6 ft., although smaller or larger blocks can be produced as desired for a particular application. For example, the friable sandstone blocks could be quarried in a 2 ft.×2 ft.×6 ft. block, then reduced to 2 ft.×2 ft.×3 ft., 12 in.×12 in.×18 in., or other size as desired. In reducing the size, it is again possible to take advantage of the fact that friable sandstone readily disaggregates. Once the friable sandstone blocks are in the final size and shape, heavy-duty sanding belts, toothed steel wheels, or shaking tables can be used to knock off irregularities and produce a finished face. Orthogonality of faces may be necessary if the application requires that the structural blocks need to be stacked vertically, e.g., for dividing walls, load bearing walls or retaining walls. The inherent structure of the prepared friable sandstone block can be locked in place by applying cement or a confining jacket.

If cement or grout is used to lock the inherent structure in place, the cement or grout can have a low viscosity so that the cement can flow into the pores of the prepared friable sandstone block. The cement, particularly micro-fine Portland cement, or grout, particularly sodium silicate grout, can be formulated to increase its strength in specific ways with time. The curing time can be adjusted to allow working time of the structural block before the structural block reaches its ultimate strength and is hard to work. In some applications, the structural block can be installed before the curing is complete and the cure completed in place. In one embodiment, the grout can be sodium silicate grout (silica/soda ratio: 3.3 by weight) comprising by volume 1.9 parts water, 1 part sodium silicate, and 0.1 part Terraset B1000 hardener. Terraset hardener is available from Minova USA, formerly Fosroc USA. In another embodiment, a greater portion of sodium silicate can be used in the sodium silicate grout for increased strength in the structural block. Coloring agents, such as dyes or pigments, can be added to the cement or grout to create structural blocks of different colors.

The cement or grout can be applied to the prepared friable sandstone block in any manner that the cement flows into the pores of the friable sandstone. In one embodiment, the friable sandstone block can be dipped into a vat of low viscosity cement so that the cement impregnates the whole structural block. In another embodiment, the individual faces of the friable sandstone block can be dipped into a shallow vat of low viscosity cement that covers the friable sandstone block to a desired depth so that the cement produces a confining layer and leaves an untreated core in the structural block. In yet another embodiment, the cement or grout can be sprayed onto the finished face of the structural block and allowed to move into the dry block by capillary action. The structural blocks cure to their ultimate strength in several weeks. For a friable sandstone such as the St. Peter Sandstone treated with sodium silicate grout, the compressive strength can be 4,000 psi or more. The structural blocks can be cured so as to permit air access to their bases by placing them on a steel grill or the like. Some applications may allow use of the structural blocks before they have attained their maximum compressive strength.

A protective coating can be applied to protect the structural block from abrasion or chemical attack. The protective coating can be applied by spraying, brushing, painting, or dipping, as a film of exterior paint, acrylic paint, epoxy paint, cyanoacrylate, fiber-reinforced cement, polysiloxane resin, or the like, and combinations thereof. Depending on the desired application, the protective coating can be limited to those faces where abrasion or chemical attack is expected. For example, walls may require protective coating on two faces, while columns may require coating on four. A full range of colors can be obtained by adding coloring agents, such as dyes or pigments, to the protective coating. In another embodiment, a confining jacket of high tensile strength material can be applied to the treated structural block to provide additional strength, before, after, or in place of the protective coating.

If a confining jacket, rather than cement, is used to lock the inherent structure in place, the confining jacket can be any high tensile strength material, such as epoxy, polyurethane, cyanoacrylate, fiber-reinforced cement, polysiloxane resin, or similar high tensile strength material, applied to the outside of the friable sandstone block. The confining jacket can vary between about 1 mm thick to about 5 mm thick, with a typical thickness of about 2 mm. The high tensile strength material can be applied by spraying, brushing, painting, or dipping. The confining jacket can also be created by fusing powdered silica disposed around the faces of the structural block. Yet another way to create the confining jacket is by applying a coating of pure sodium silicate grout (silica/soda ratio: 3.3 by weight) and then applying another coating of a strong acid, which sets the grout to a high strength.

The confining jacket can be used to protect the structural block from abrasion or chemical attack, or an additional protective coating of exterior paint, acrylic paint, epoxy paint, cyanoacrylate, or the like, and combinations thereof, can be applied over the confining jacket. Coloring agents such as dyes or pigments can be added to the high tensile strength material to provide a full range of colors.

Fabricating a structural block from unquarriable friable sandstone comprises treating the friable sandstone to lock in the inherent structure of the unquarriable friable sandstone in a friable sandstone deposit, quarrying a friable sandstone block from the friable sandstone deposit, and finishing the friable sandstone block. The unquarriable friable sandstone will disaggregate with handling if removed prior to locking in the inherent structure. The quarrying methods can be selected to suit the technology and infrastructure available in a particular locale. Those skilled in the art will appreciate that a variety of methods can be employed to achieve the desired result.

Figure 4:
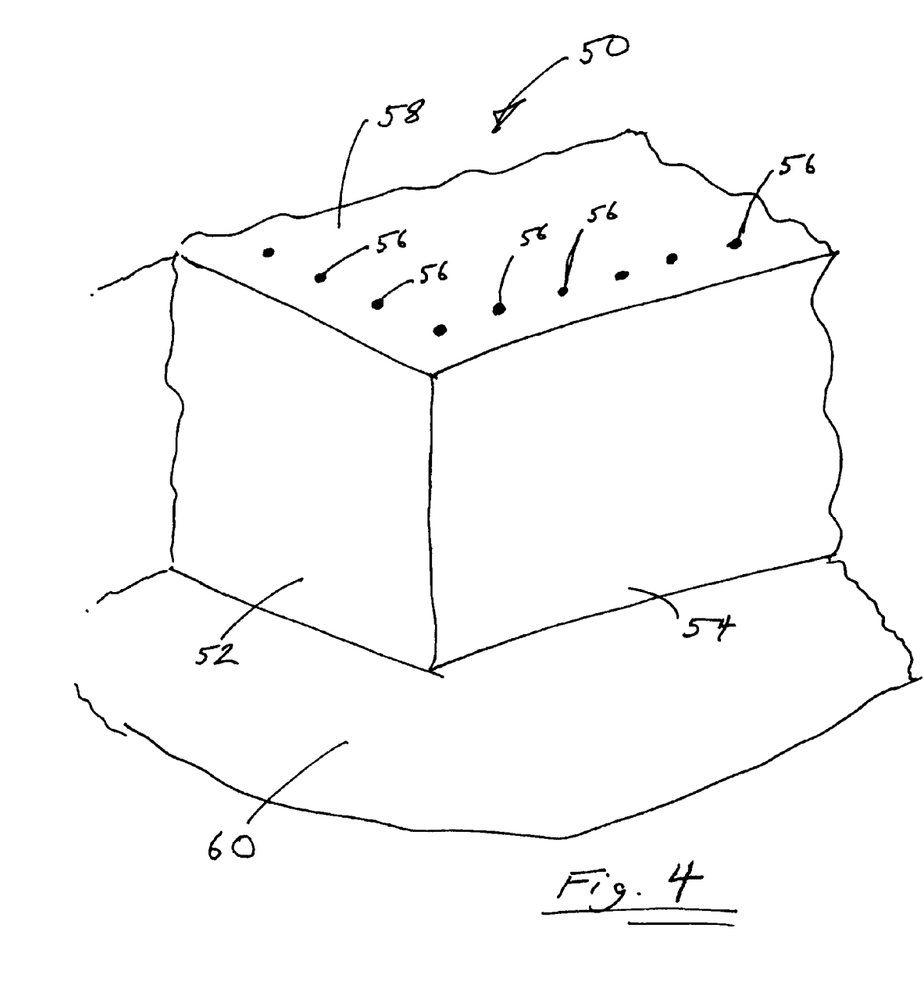
FIG. 4 shows a perspective view of rough quarrying for making a structural block from friable sandstone according to the present invention.

FIG. 4 shows a perspective view of rough quarrying for making a structural block from friable sandstone according to the present invention. A rough face of the friable sandstone deposit can be initially prepared with rippers, front-end loaders, scrapers, backhoes, and trucks. A bench 50 with two faces 52, 54 at approximately right angles to one another can be created in the upper part of the friable sandstone deposit. The top 58 and bottom 60 of the bench 50 need to be wide enough to accommodate equipment: a drilling rig on the top 58, and hydraulic lifts and front-end loaders on the bottom 60. Typically, the bench can have faces 52, 54 of about 12 feet and the bottom 60 can have a minimum width of about 8 feet.

Holes 56 can be drilled downward vertically from the top 58 of the bench 50 to be used in injecting cement or grout into the friable sandstone deposit, which provides a barrier to subsequent cement or grout injections and keeps the cement or grout from spilling through the quarried face. The holes 56 can be drilled with drilling equipment of the percussion-rotary or rotary type with air and small amounts of water as circulating fluid, providing high drilling rates and low cost drilling. The holes can be flushed with the circulating fluid to avoid grinding the sand grains. The hole or boring spacing can be adjusted to the quarry particulars and available equipment. The diameter of holes can be close to the minimum compatible with down-hole tools, such as grouting pipes, packers, and hydraulic splitters to be inserted in the holes. Typically, the holes can have a 2½ inch diameter drilled on 2-foot centers to a vertical depth of 12 feet.

Two perpendicular series of holes 56 can be drilled about 2 to 3 feet from the crest of the each right angle face. The series of holes can extend along the crest of the bench for about 40 to 80 feet. Additional series of holes for later use can be drilled throughout the friable sandstone deposit farther from the crest of the bench or the additional series can be drilled as quarrying progresses.

Grout can be injected in the holes 56 to create cohesive quarry faces and to provide a barrier to subsequent grout injections to keep grout from spilling through the quarried face. The cement or grout, particularly sodium silicate grout, can be formulated to increase its strength in specific ways with time. The curing time can be adjusted to allow working time of the friable sandstone block before the friable sandstone block reaches its ultimate strength and is hard to work.

For example, the grout can be formulated so that the grout remains fairly soft for 24 to 28 hours, so that the grouted friable sandstone still has the friability of the untreated material and can be cut and shaped very easily. The grouted friable sandstone increases in strength gradually over the next few days, so that it can be handled in large cohesive blocks. The grout has not cured to its ultimate strength so the friable sandstone blocks can still be cut and shaped with relative ease. The grout continues to cure until the friable sandstone blocks acquire their ultimate strength after several weeks. In one embodiment, the grout can be sodium silicate grout comprising by volume 1.9 parts water, 1 part sodium silicate, and 0.1 part Terraset B1000 hardener. Terraset hardener is available from Minova USA, formerly Fosroc USA. In another embodiment, a greater portion of sodium silicate can be used in the sodium silicate grout for increased strength in the structural block. Coloring agents, such as dyes or pigments, can be added to the cement to create structural blocks of different colors.

Cement or grout can be injected in the holes 56 using standard consolidation grouting equipment. The grout or cement typically can be of low viscosity, so relatively low injection pressures of about 10 psig plus 1 psig per foot of depth can be used. After the cement or grout is injected, plastic sleeve inserts with plugged ends and outside diameters fairly close to the hole size can be installed in the vertical holes to displace the grout and the leave holes accessible to splitting tools at a later stage. The plastic sleeve inserts should fit snugly so the grout pressure does not push them out of the hole, and so that grout does not come into the hole and leak to the surface. In another embodiment, the plastic sleeves can be weighed down with sand to retain them in the hole. In yet another embodiment, the plastic sleeves can be inflated against the borehole walls to hold them in place. In yet another embodiment, the plastic sleeve inserts can be omitted and bailer used to remove the grout as the grout is about to set. The bailer comprises a tube with a hinged flap at one end, which permits the grout to flow into the tube as the bailer is inserted in the hole and seals the tube when withdrawn and full of grout. The bailer can be inserted in the hole and withdrawn to remove the nearly set grout. In yet another embodiment, the plastic sleeve inserts can be omitted and a stream of air or water used to blow the grout from the hole as the grout is about to set.

Three or more hydraulic splitters, such as Darda Hydraulic Splitters, can be lowered inside the 2-foot-centered vertical holes and used to apply tension to the series of holes to fracture the friable sandstone deposit along each of the series of holes. The friable sandstone can be allowed to develop enough cohesion from the curing of the cement to resist the stresses of handling in large blocks before splitting the series of holes. The splitting results in two prepared faces at right angles to one another, which are the outside surfaces of the future friable sandstone block. The fracturing takes advantage of the fact that friable sandstone has a very low tensile strength, so that friable sandstone splits in tension with little effort. The fractures stop propagating at the bench floor, because tensile strains cannot be created as easily below the elevation of the quarrying face. Fractures can extend horizontally for 40 or more feet, depending on the number of hydraulic jacks used. After fracturing, the fractures can be held open with wedges and material removed from the prepared faces with standard earth moving equipment as used in preparing the rough faces. Two vertical 12-foot high, prepared faces of cohesive material now exist normal to one another for quarrying and provide barriers to subsequent grout injections.

Figure 5:
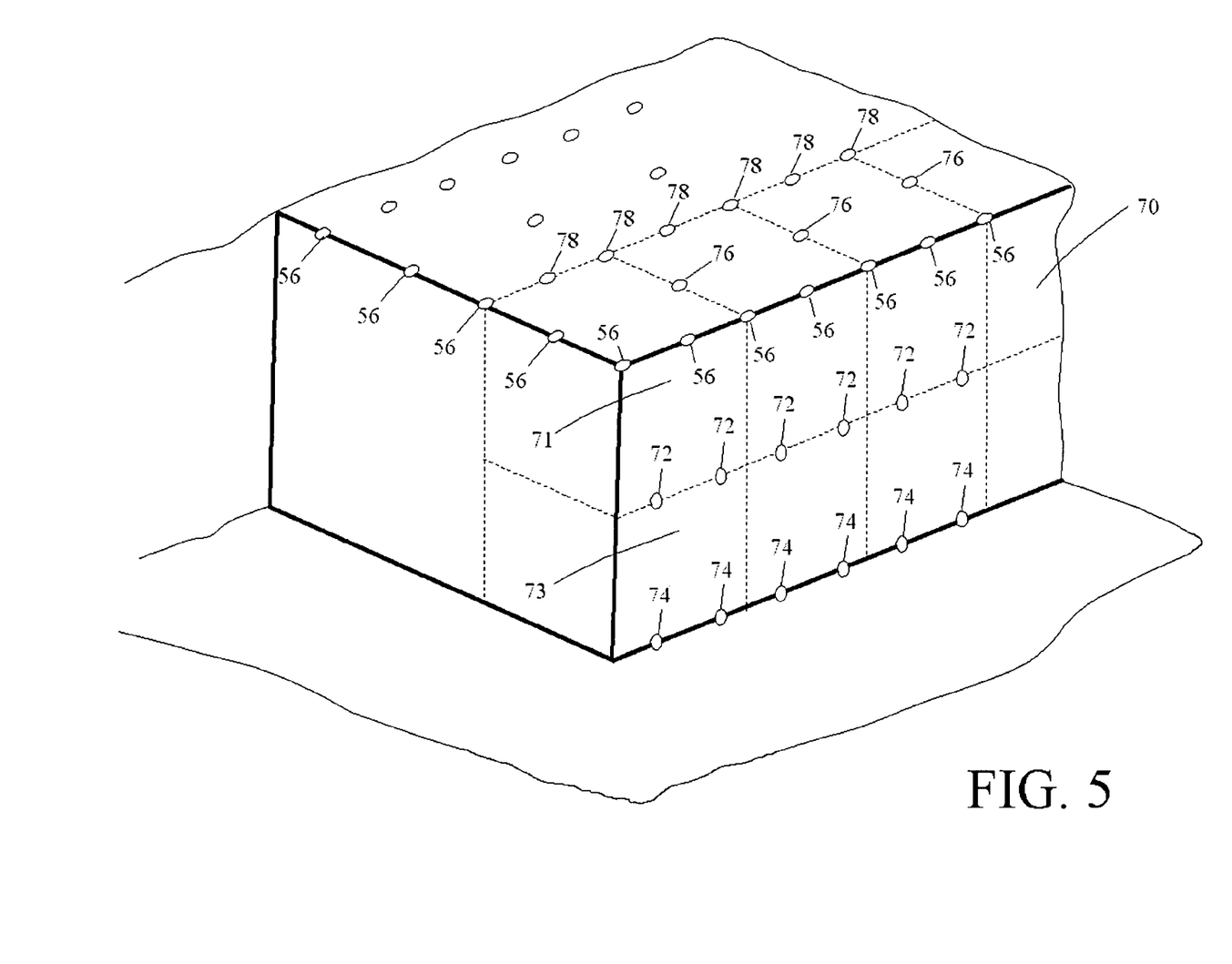
FIGS. 5 & 6 show a perspective view and top view, respectively, of block quarrying for making a structural block from friable sandstone according to the present invention.
Figure 6:
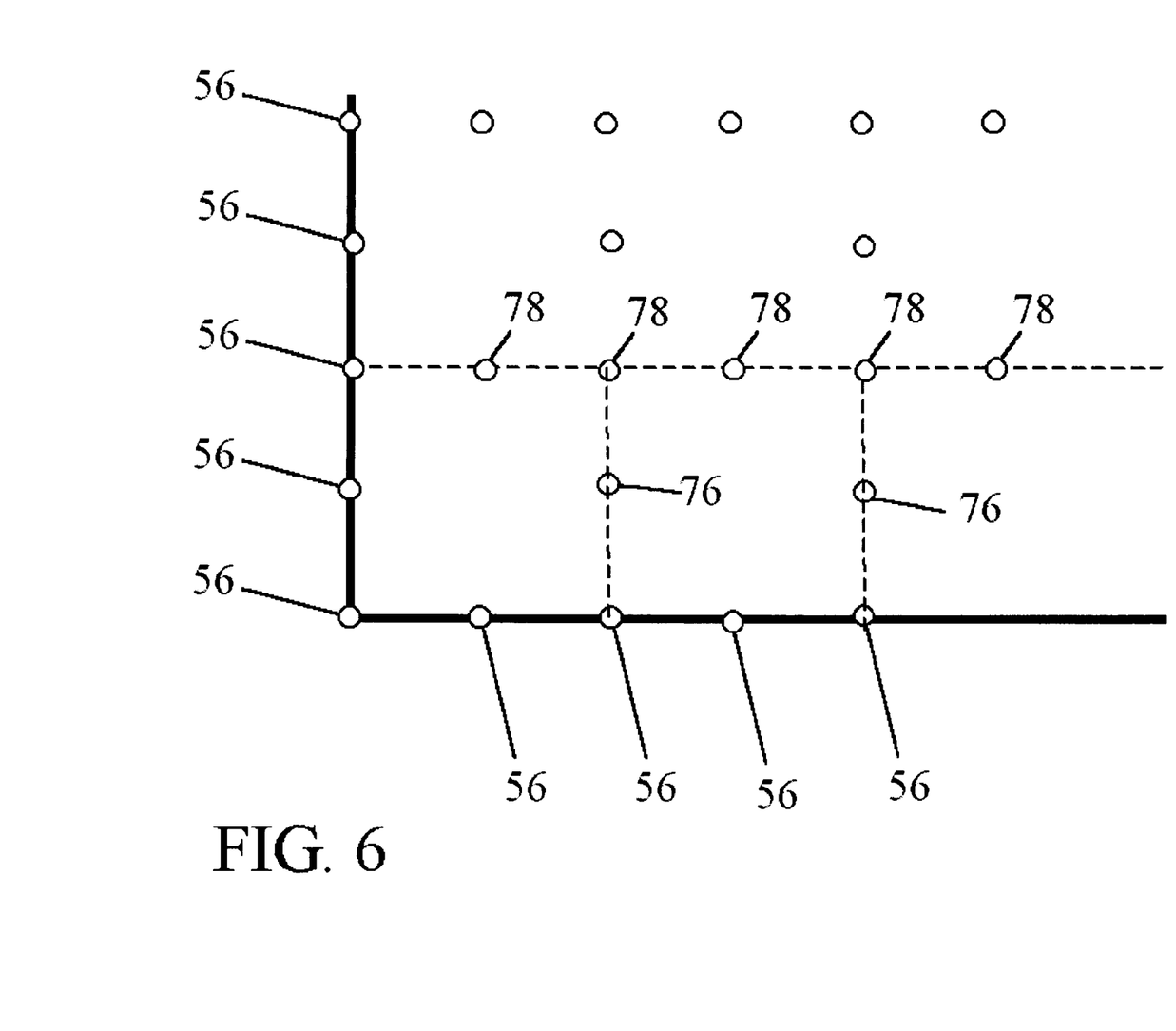

FIGS. 5 & 6 shows a perspective view and top view, respectively, of block quarrying for making a structural block from friable sandstone according to the present invention. A prepared face can be selected as the quarrying face and two series of horizontal holes drilled with a rotary or rotary-percussive drill. The first series of horizontal holes 72 can be located halfway up the quarrying face 70 and the second series of horizontal holes 74 can be located at the foot of the quarrying face 70. The horizontal holes can be used for inducing fractures and lifting the friable sandstone blocks. Typically, the horizontal holes can be 4 feet deep on 2-foot centers and can begin one foot away from the corner of the two vertical prepared faces. The first two feet into the quarrying face 70 will be slightly cohesive because of previous cement injections. Drilling can be performed as soon as practical after the cement injection to avoid drilling through hardened material. Plastic sleeve inserts can be inserted into the series of horizontal holes to prevent cement leakage.

Holes can be drilled downward from the top of the bench to be used in injecting cement into the friable sandstone deposit and for hydraulically splitting the friable sandstone deposit into slabs and blocks. The holes can be drilled with drilling equipment of the rotary or rotary-percussive type with air as circulating fluid, providing high drilling rates and low cost drilling. The holes can be flushed with water or air to avoid grinding the sand grains. The hole spacing can be adjusted to the quarry particulars and available equipment. The diameter of holes can be close to the minimum compatible with down-hole tools, such as grouting pipes, packers, and hydraulic splitters to be inserted in the holes. Typically, the holes can have a 2½ inch diameter drilled on 2- and 4-foot centers to a vertical depth of 12 feet.

The first series of vertical holes 76 closest to the quarrying face can be about 2 feet from the quarrying face 70 and drilled on 4-foot centers along the quarrying face. The second series of vertical holes 78 can be about 4 feet from the quarrying face 70 and drilled on 2-foot centers along the quarrying face. All the vertical holes can be used for cement injection and for development of hydraulic fractures, however, the first series of vertical holes 76 closer to the quarrying face 70 can be used to induce fractures normal to the quarrying face 70 and the second series of vertical holes 78 further from the quarrying face 70 can be used to induce fractures parallel to the quarrying face 70. The series of vertical holes can extend along the quarrying face 70 for about 20 to 80 feet. Additional series of vertical holes continuing the pattern of the first and second series of vertical holes can be drilled throughout the friable sandstone deposit further from the quarrying face 70 or additional series can be drilled as the quarrying progresses. Plastic sleeve inserts can be inserted into the first and second series of vertical holes to prevent cement leakage.

Cement or grout can be injected in the first and second series of vertical holes to render the friable sandstone quarriable, to create cohesive quarry faces and to provide a barrier to subsequent cement injections to keep grout from spilling through subsequent quarrying faces. Grout can be injected in the series of vertical holes using standard consolidation grouting equipment. The plastic sleeve inserts can be removed from the vertical holes, the grout injected, and the plastic sleeve inserts replaced. The cement, particularly sodium silicate grout, can be formulated to increase its strength in specific ways with time. The curing time can be adjusted to allow working time of the friable sandstone block before the friable sandstone block reaches its ultimate strength and becomes hard to work.

For example, the grout can be formulated so that the grout remains fairly soft for 24 to 48 hours, so that the grouted friable sandstone still has the friability of the untreated material and can be cut and shaped very easily. The grouted friable sandstone increases in strength gradually for the next few days, so that it can be handled in large cohesive blocks. The grout has not cured to its ultimate strength so the friable sandstone blocks can still be cut and shaped with relative ease. The grout continues to cure until the friable sandstone blocks acquire their ultimate strength after several weeks. In one embodiment, the grout can be sodium silicate grout comprising by volume 1.9 parts water, 1 part sodium silicate, and 0.1 part Terraset B1000 hardener. Terraset hardener is available from Minova USA, formerly Fosroc USA. In another embodiment, a greater portion of sodium silicate can be used in the sodium silicate grout for increased strength in the structural block. Coloring agents, such as dyes or pigments, can be added to the cement to create structural blocks of different colors.

In another embodiment, the cement or grout can be applied to the surface of the friable sandstone deposit and allowed to percolate to a desired depth. Only enough cement or grout is applied to allow the friable sandstone deposit to hold together so that it can be quarried into friable sandstone blocks, and not so much as to saturate all the pore space in the friable sandstone. The quarried friable sandstone blocks can be treated with cement or grout again or finished into structural blocks as desired. Cementing the friable sandstone without saturating all the pore space can be useful if low bulk densities structural blocks are desired. Cementing the friable sandstone without saturating all the pore space also allows flexibility for later, multi-stage treatment. For example, cement including a different color or cement with different properties can be used on an individual quarried friable sandstone block, rather than treating all the friable sandstone blocks in a slab the same.

When the treated region of the friable sandstone reaches the desired degree of strength and workability, the friable sandstone blocks can be fractured from the friable sandstone deposit. The plastic sleeve inserts can be removed and each fracture performed with hydraulic splitters, such as Darda Hydraulic Splitters. In one embodiment, the first fracture can be made along the second series of vertical holes 78 farther from the quarrying face 70 to form a slab along the quarrying face 70. The next fractures can be made with the first series of vertical holes 76 closest to the face normal to the quarrying face 70, to form double height blocks. Two friable sandstone blocks can be formed from the double height block.

The first friable sandstone block 71 is fractured at the first series of horizontal holes 72 drilled halfway up the quarrying face 70, then removed from the quarrying face 70. The friable sandstone block can be removed with a forklift, such as an 8-ton forklift, having prongs spaced to fit inside the horizontal holes. The second friable sandstone block 73 is fractured at the second series of horizontal holes 74 drilled at the foot of the quarrying face 70, then removed from the quarrying face 70 with a forklift. The quarrying process can be repeated and then the friable sandstone blocks finished into structural blocks.

In another embodiment, a wire saw can be used to cut the double height friable sandstone blocks. A pair of intersecting vertical and horizontal holes or pair of intersecting horizontal holes is drilled into the friable sandstone deposit. The cutting wire of a wire saw, such as an OGYU wire saw, is inserted through the intersecting holes. The wire saw drives the cutting wire to cut the sandstone and create a quarry face, without engaging the hardness of the quartz grains.

The friable sandstone blocks can be quarried in the final size, or can be quarried in a large block, then split or cut to a smaller final size. Large friable sandstone blocks can be used for applications such as bridge piers, overpass piers, high-capacity structural columns, and the like.

Figure 7:
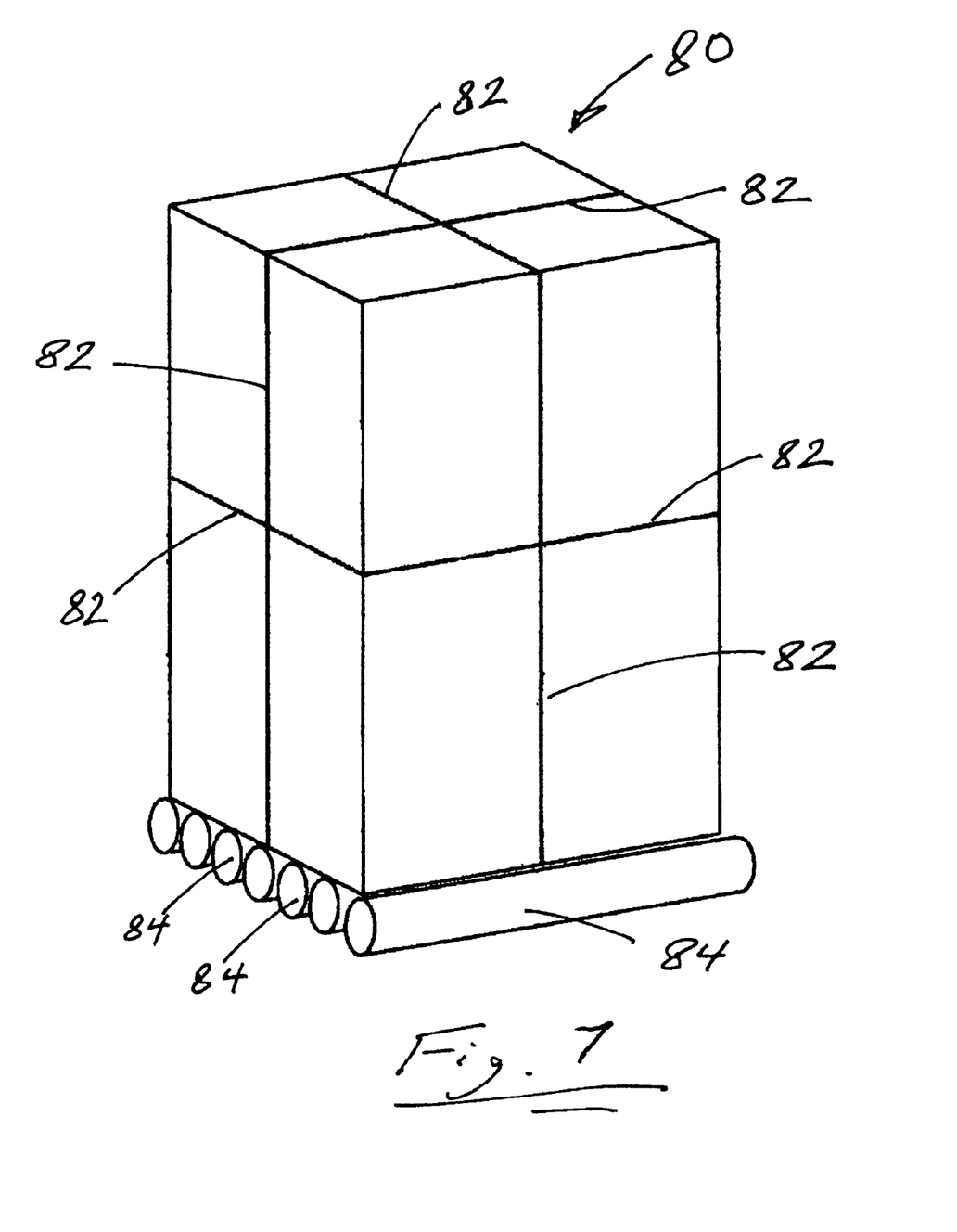
FIG. 7 shows a perspective view of friable sandstone block prepared for splitting for making a structural block from friable sandstone according to the present invention.

FIG. 7 shows a perspective view of friable sandstone block prepared for splitting for making a structural block from friable sandstone according to the present invention. The friable sandstone block 80 can be split by forming grooves 82 in the faces of the friable sandstone block 80, such as 1 inch×2 inch grooves around the friable sandstone block 80, quartering each face. The grooves 82 can be formed with a low velocity, high torque, toothed steel wheel cutter. The grooves can be formed before the friable sandstone block has cured so that sand grains can be dislodged rather than ground. Mechanical or hydraulic splitters can be placed along the entire length of the grooves of opposing faces of the friable sandstone block to induce fractures. The friable sandstone block 80 can be supported on rollers 84 to avoid friction and enhance splitting. The splitting can be repeated until the desired friable sandstone block size is obtained.

Figure 8:
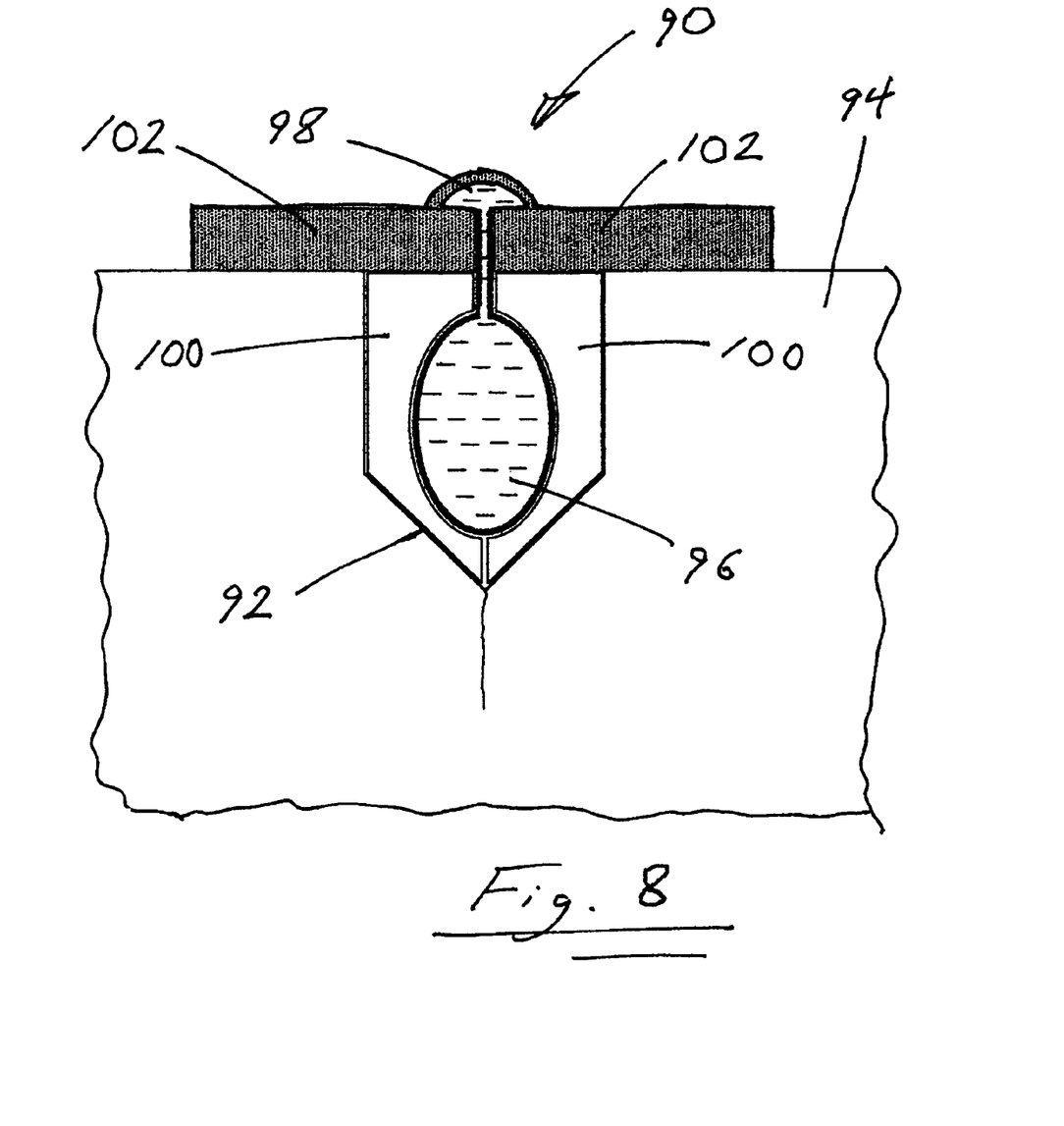
FIG. 8 shows a cross section of a hydraulic hand splitter for use in making a structural block from friable sandstone according to the present invention.

FIG. 8 shows a cross section of a hydraulic hand splitter for use in making a structural block from friable sandstone according to the present invention. The hand splitter 90 can be disposed along a groove 92 in a friable sandstone block 94. A bladder 96 filled with oil communicates with a pressure channel 98 and is disposed within a steel shell 100 that fits snugly into the groove 92. A platform 102 supports the various parts and forms the pressure channel 98. The pressure channel 98 can be pressurized with a hand or motorized pump (not shown), the oil pressure in the bladder 96 increases, the steel shell 100 applies pressure to the friable sandstone block 94, which splits.

Once the friable sandstone blocks are the final size and shape, heavy-duty sanding belts, toothed steel wheels, or shaking tables can be used to knock off irregularities and produce a finished face. Orthogonality of faces may be necessary if the application requires that the structural blocks need to be stacked vertically, e.g., for any type of wall.

The inherent structure of the prepared friable sandstone block can be locked in place by applying cement or a confining jacket. In addition to cement or grout applied to the friable sandstone deposit to enable quarrying of the unquarriable friable sandstone, cement or grout can be applied to the friable sandstone block if the grout permeation is less than complete or the application requires total cement impregnation. The cement or grout can have a low viscosity so that the cement can flow into the pores of the prepared friable sandstone block. The cement, particularly sodium silicate grout, can be formulated to increase its strength in specific ways with time. The curing time can be adjusted to allow working time of the structural block before the structural block reaches its ultimate strength and is hard to work. In some applications, the structural block can be installed before the curing is complete and the cure completed in place. In one embodiment, the grout can be sodium silicate grout (silica/soda ratio: 3.3 by weight) comprising by volume 1.9 parts water, 1 part sodium silicate, and 0.1 part Terraset B1000 hardener. Terraset hardener is available from Minova USA, formerly Fosroc USA. In another embodiment, a greater portion of sodium silicate can be used in the sodium silicate grout for increased strength in the structural block. Coloring agents, such as dyes or pigments, can be added to the cement to create structural blocks of different colors.

The cement can be applied to the prepared friable sandstone block in any manner that the cement flows into the pores of the friable sandstone. In one embodiment, the friable sandstone block can be dipped into a vat of low viscosity cement. The cement impregnates the whole structural block. In another embodiment, the individual faces of the friable sandstone block can be dipped into a shallow vat of low viscosity cement that covers the friable sandstone block to a desired depth. The cement produces a confining layer and leaves an untreated or less treated core in the structural block.

The structural blocks will cure to their ultimate strength in several weeks. For a friable sandstone such as the St. Peter Sandstone treated with sodium silicate grout, the compressive strength can be 4,000 psi or more. The structural blocks can be cured so as to permit air access to their bases by placing them on a steel grill or the like. Some applications may allow use of the structural blocks before they have attained their maximum compressive strength.

A protective coating can be applied to protect the structural block from abrasion or chemical attack. The protective coating can be applied by spraying, brushing, painting, or dipping as a film of exterior paint, acrylic paint, epoxy paint, cyanoacrylate, fiber-reinforced cement, polysiloxane resin, or the like, and combinations thereof. Depending on the desired application, the protective coating can be limited to those faces where abrasion or chemical attack is expected. For example, walls may require protective coating on two faces, while columns may require coating on four. A full range of colors can be obtained by adding coloring agents such as dyes or pigments to the protective coating. In another embodiment, a confining jacket of high tensile strength material can be applied to the treated structural block to provide additional strength, before, after, or in place of the protective coating.

If a confining jacket, rather than cement, is used to lock the inherent structure in place, the confining jacket can be a high tensile strength material, such as epoxy, polyurethane, cyanoacrylate, fiber-reinforced cement, polysiloxane resin, or similar high tensile strength material, applied to the outside of the friable sandstone block. The confining jacket can between about 1 mm thick to about 5 mm thick, with a typical thickness of about 2 mm. The high tensile strength material can be applied by spraying, brushing, painting, or dipping. The confining jacket can also be created by fusing powdered silica disposed around the faces of the structural block. Yet another way to create the confining jacket is by applying a coating of pure sodium silicate grout (silica/soda ratio: 3.3 by weight) and then applying another coating of a strong acid, which sets the grout to a high strength.

The confining jacket can be used to protect the structural block from abrasion or chemical attack, or an additional protective coating of exterior paint, acrylic paint, epoxy paint, cyanoacrylate, or the like, can be applied over the confining jacket. Coloring agents such as dyes or pigments can be added to the high tensile strength material to provide a full range of colors.

Those skilled in the art will appreciate that the additional refinements can be made to the quarrying and manufacturing processes to suit the particular nature of the natural friable sandstone deposit and the desired characteristics of the finished structural blocks. In one example, additional holes can be drilled in the friable sandstone block to introduce additional cement or grout or to introduce expandable anchors for lifting the friable sandstone blocks. In another example, grooves or channels can be cut in the quarry face of the friable sandstone deposit or face of the friable sandstone block to assure that the friable sandstone fractures cleanly. In yet another example, reinforcing or pre-stressing bars can be inserted in holes in the friable sandstone blocks and/or grooves along the outside of the friable sandstone blocks. The bars, such as iron or steel bars, improve the tensile strength of the structural blocks. The bars can be fixed in the holes or grooves with cement or resin, such as Portland cement or polysiloxane resin.

It is important to note that FIGS. 1–8 illustrate specific applications and embodiments of the present invention, and are not intended to limit the scope of the present disclosure or claims to that which is presented therein. For example, any process that creates structural blocks while preserving the inherent structure of the friable sandstone falls within the scope of present invention. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A structural block made from friable sandstone, the friable sandstone being fragile and disaggregation prone, comprising:
   a friable sandstone block, the friable sandstone block having an inherent structure and being formed from the friable sandstone; and
   cement, the cement disposed within the inherent structure.

2. The structural block of claim 1 wherein the cement is sodium silicate grout.

3. The structural block of claim 2 wherein the sodium silicate grout comprises 1.9 parts water, 1 part sodium silicate, and 0.1 part hardener, the sodium silicate having a silica/soda ratio by weight of 3.3.

4. The structural block of claim 1 wherein the cement further comprises a coloring agent.

5. The structural block of claim 1 further comprising a confining jacket disposed about the friable sandstone block.

6. The structural block of claim 5 wherein the confining jacket is a material selected from the group consisting of epoxy, one-component polyurethane, two-component polyurethane, cyanoacrylate, fiber-reinforced cement, polysiloxane resin, fused silica, and combinations thereof.

7. The structural block of claim 1 further comprising a protective coating disposed about the friable sandstone block.

8. The structural block of claim 7 wherein the protective coating is a material selected from the group consisting of exterior paint, acrylic paint, epoxy paint, cyanoacrylate, fiber-reinforced cement, polysiloxane resin, and combinations thereof.

9. The structural block of claim 1 wherein the cement is microfine Portland cement.

10. The structural block of claim 1 wherein the friable sandstone is unquarriable.

11. The structural block of claim 1 wherein the friable sandstone is selected from the group consisting of quartz arenites, aged sands, and St. Peter sandstone.

12. The structural block of claim 1 wherein the friable sandstone has a thermal conductivity less than half that of concrete of the same bulk density.

13. The structural block of claim 1 wherein the cement disposed within the inherent structure locks the inherent structure in position.

14. The structural block of claim 1 wherein the friable sandstone comprises sand grains and the cement disposed within the inherent structure prevents rotation and separation of the sand grains.

15. The structural block of claim 1 wherein the friable sandstone is Ottawa sand.

16. A structural block made from friable sandstone, the friable sandstone being fragile and disaggregation prone, comprising:
    a core, the core formed from the friable sandstone having inherent structure; and
    a confining layer, the confining layer disposed about the core.

17. The structural block of claim 16 further comprising a protective coating disposed about the confining layer.

18. The structural block of claim 16 wherein:
    the friable sandstone has an inherent structure;
    the confining layer is formed from the friable sandstone; and
    the confining layer further comprises cement disposed within the inherent structure.

19. The structural block of claim 16 wherein the confining layer is a confining jacket of high tensile strength material.

20. The structural block of claim 19 wherein the high tensile strength material is selected from the group consisting of epoxy, one-component polyurethane, two-component polyurethane, cyanoacrylate, fiber-reinforced cement, polysiloxane resin, fused silica, and combinations thereof.

21. The structural block of claim 16 wherein the friable sandstone is unquarriable.

22. The structural block of claim 16 wherein the friable sandstone is selected from the group consisting of quartz arenites, aged sands, and St. Peter sandstone.

23. The structural block of claim 16 wherein the friable sandstone has a thermal conductivity less than half that of concrete of the same bulk density.

24. The structural block of claim 16 wherein the confining layer locks the inherent structure in position.

25. The structural block of claim 16 wherein the friable sandstone comprises sand grains and the confining layer prevents rotation and separation of the sand grains.

26. The structural block of claim 16 wherein the friable sandstone is Ottawa sand.

27. A structural block made from friable sandstone, the friable sandstone being fragile and disaggregation prone, comprising:
    a friable sandstone block, the friable sandstone block having an inherent structure and being formed from the friable sandstone; and
    means for maintaining the inherent structure in the friable sandstone block.

28. The structural block of claim 27 wherein the friable sandstone is unquarriable.

29. The structural block of claim 14 wherein the means for maintaining the inherent structure in the friable sandstone block comprises means for locking the inherent structure in position.

30. The structural block of claim 27 wherein the friable sandstone comprises sand grains and the means for maintaining the inherent structure in the friable sandstone block comprises means for preventing rotation and separation of the sand grains.

31. The structural block of claim 27 wherein the friable sandstone is Ottawa sand.

* * * * *